(12) United States Patent
Shirk et al.

(10) Patent No.: US 6,731,841 B1
(45) Date of Patent: May 4, 2004

(54) FOLDED WAVEGUIDE OPTICAL DEVICES

(75) Inventors: Kevin W. Shirk, Sunnyvale, CA (US);
Daoyi Wang, Sunnyvale, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 10/155,899

(22) Filed: May 24, 2002

(Under 37 CFR 1.47)

(51) Int. Cl.[7] .......................... G02B 6/26; G02B 6/42; G02B 6/30
(52) U.S. Cl. ........................ 385/39; 385/41; 385/42; 385/49
(58) Field of Search ................ 385/39, 41–46, 385/49

(56) References Cited

U.S. PATENT DOCUMENTS

| | | | | |
|---|---|---|---|---|
| 4,796,975 A | * | 1/1989 | Lukas et al. ................ 385/50 |
| 5,883,991 A | * | 3/1999 | Funabashi ................... 385/39 |
| 6,122,423 A | * | 9/2000 | You et al. .................... 385/49 |
| 6,128,428 A | * | 10/2000 | Yoneda ........................ 385/49 |
| 6,296,401 B1 | * | 10/2001 | Paris ............................ 385/96 |
| 6,563,971 B1 | * | 5/2003 | Burton et al. ................ 385/15 |
| 2002/0054726 A1 | * | 5/2002 | Fondeur et al. .............. 385/15 |
| 2002/0187432 A1 | * | 12/2002 | Dawes et al. ............... 430/321 |

* cited by examiner

*Primary Examiner*—John D. Lee
*Assistant Examiner*—Tina M Lin
(74) *Attorney, Agent, or Firm*—Joe Zheng

(57) ABSTRACT

Optical apparatus for combining and splitting optical signals using folded waveguides and method for making the same are disclosed. According to one aspect of the present invention, at least one waveguide used in the optical apparatus is folded around according to a predefined curve to couple to other waveguides. The predefined curve is so designed as to minimize possible insertion loss as a result of such folding of the waveguide. The proper folding of the waveguide leads to modified designs of the optical devices with all the ports on one side so as to simplify the alignment procedures afterward. In addition, the optical device according to the present invention has much smaller footprint and makes it possible to increase higher yield from fabricating substrate material on which the waveguides are formed.

17 Claims, 6 Drawing Sheets

FOLDED WAVEGUIDE OPTICAL DEVICES

BACKGROUND OF THE INVENTION

1. Technical Field

The invention relates to fiber optical devices. More particularly, the invention relates to optical couplers for combining or splitting optical signals using folded waveguides and method for making the same.

2. Description of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

Optical telecommunications generally involves the use of light beams propagating through optical fibers to transmit data from one end to another end. When an optical fiber carrying an input data signal that needs to be connected to two destinations, the signal needs to be split into two parts. This is achieved in the art by a coupler. When used for the splitting purpose, it is often referred to as a splitter. Generally, a coupler is bi-directional. When a coupler is used to combine two signals respectively from two sources, the coupler is used as a combiner to combine the two signals onto a single optical fiber.

FIG. 1 shows a top view of an optical coupler 100 according to a generic design known in the art. In particular, when used as a splitter, the optical coupler 100 has an input port 102 at one end and four output ports 104 at the other end. In operation, an optical signal coming to the input port 102 is coupled into a waveguide 106 that forks into two forking waveguides 108 and 110 or a Y junction element. As shown in the figure, the two waveguides 108 and 110 or are respectively further split into two ending waveguides 112, each coupled to one of the four output ports 104. As a result, the optical signal can be split into four parts, respectively output from the four output ports 104.

One of the problems with the optical coupler 100 is the alignment procedures afterward. In general, an alignment of the input port 102 with respect to a device may need to be performed first, then another alignment of the four outputs 104 with respect to one or more other devices needs to be performed, or vice versa. While many of the alignment procedures are performed manually, this increases the overall costs of such devices. There is thus a need for the devices that can simplify the alignment procedures without significant loss of performance of the devices. In addition, the optical coupler 100 has ports (i.e., input and output ports) on both sides, the resultant footprint of the optical coupler 100 could limit its uses in many situations. There is another need for the devices that can be designed with reduced footprint.

SUMMARY OF THE INVENTION

The present invention, generally speaking, pertains to an optical apparatus for combining and splitting optical signals using folded waveguides and method for making the same. According to one aspect of the present invention, at least one waveguide used in the optical apparatus is folded around according to a predefined curve to couple to other waveguides. The predefined curve is so designed as to minimize possible insertion loss as a result of such folding of the waveguide. The proper folding of the waveguide leads to modified designs of the optical devices with all the ports on one side so as to simplify the alignment procedures afterward. In addition, the optical device according to the present invention has much smaller footprint and makes it possible to increase higher yield from fabricating substrate material on which the waveguides are formed.

In one embodiment, a main waveguide is folded in such a way that both ends of the main waveguide are towards the same direction, one end is coupled to a port and the other end forks into or is coupled to two separate waveguides. Each of the two separate waveguides further forks into two separate waveguides. In one application, the optical device is used to combine signals. Several individual signals can thus be merged into the main waveguide from the separate waveguides. In another application, the optical device is used to split a signal. The signal coming out of the main waveguide is split into two signals that can be further respectively split along the separate waveguides.

According to another embodiment having a first port and a set of second ports, a pair of immediate waveguides, at one end, coupled to the main waveguide is folded around two opposite directions, at the other end, to respectively couple to the other waveguides so as balance the second ports around the first port, all are on one side.

One of the objects of the present invention is to provide an effective solutions for designing, configuring, or manufacturing couplers used for either splitting or combining optical signals by bending one or two waveguides properly.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention pertains to optical devices primarily used for combining or splitting optical signals. In particular, the optical devices employ optical waveguide that is folded in such a way that both of input port(s) and output port(s) of the optical devices are at one side. As a result, the alignment of such devices is significant simplified.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
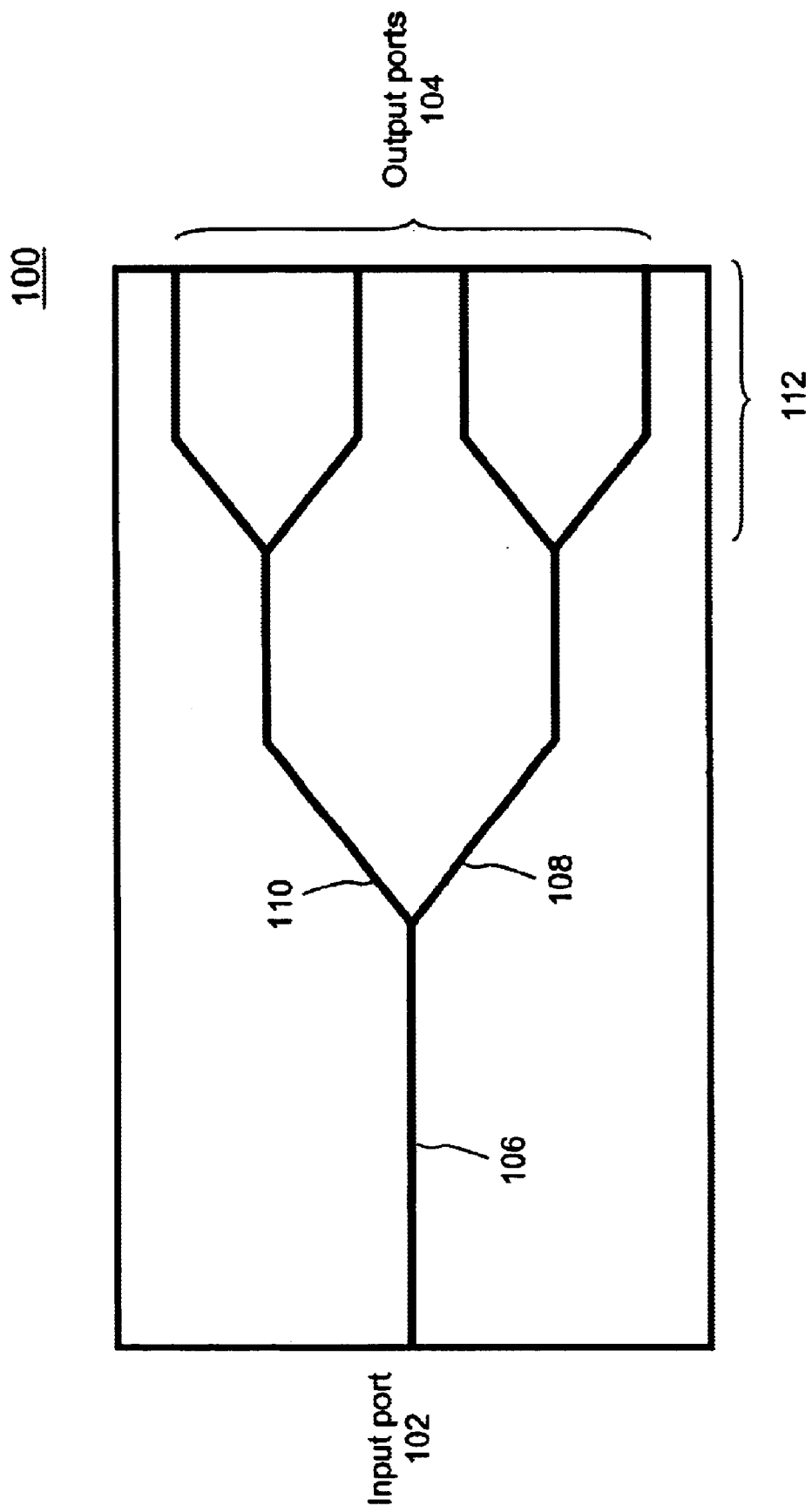
FIG. 1 shows a top view of an optical coupler according to a generic design known in the art.
Figure 2:
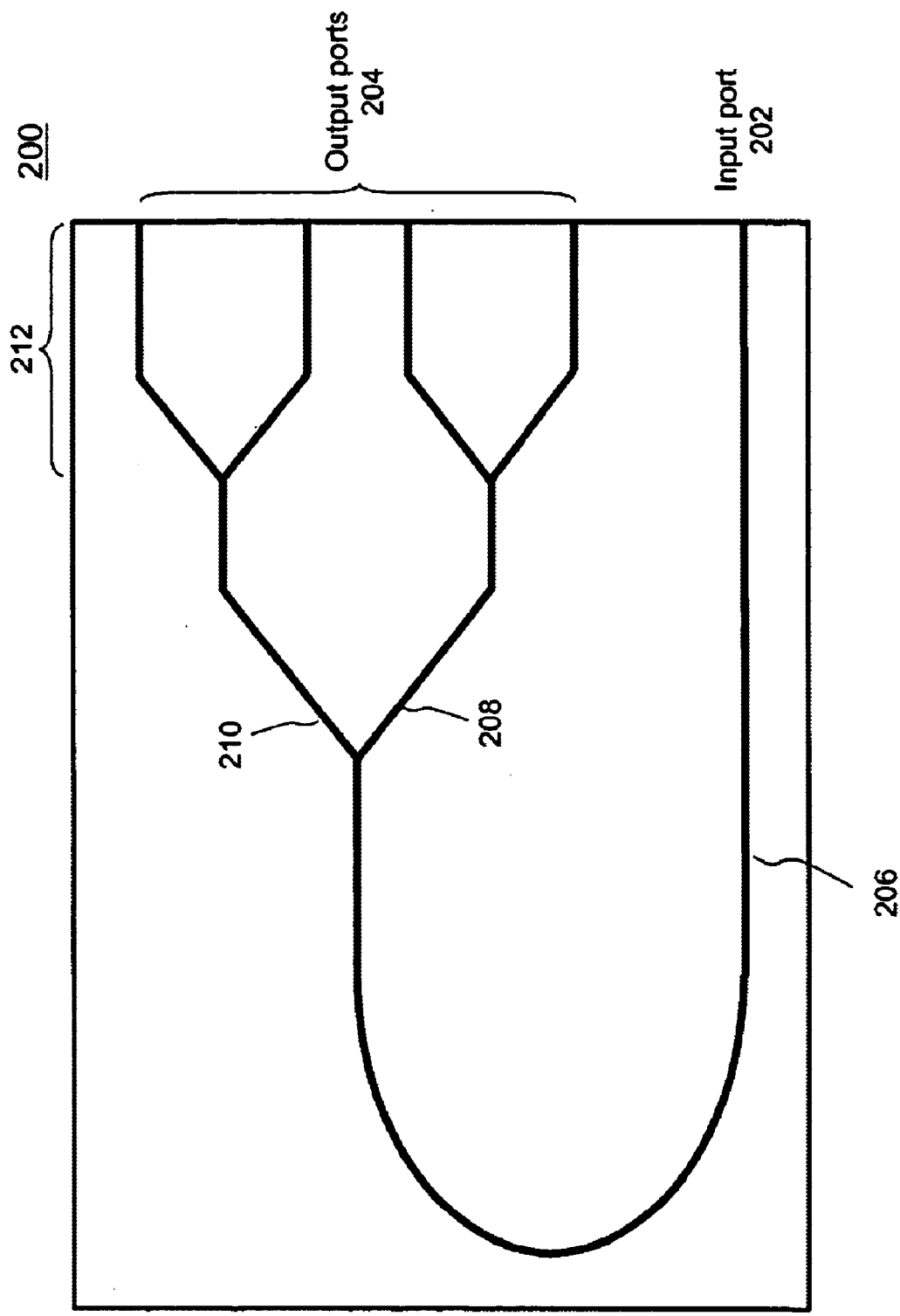
FIG. 2 shows a top view of a simplified optical device according to one embodiment of the present invention.

Referring now to the drawings, in which like numerals refer to like parts throughout the several views. FIG. 2 shows a top view of a simplified optical device 200 according to one embodiment of the present invention. To facilitate the description of the present invention, the optical device 200 is assumed to be used as a 1:N splitter, namely splitting one signal to N signals, wherein N is preferably $2^n$ and n is a finite integer. FIG. 2 shows that N=4 (i.e., n=2). The optical device 200 includes an input port 202 and four output ports 204, both of the input port 202 and the output ports 204 are at one side of the optical device 200. The input port 202 is coupled to a main waveguide 206 that is folded according to a predefined curve. Consequently, two ends. (not shown) of the waveguide 206 are towards the same direction. If one of the two ends is coupled to the input port 202, the other one of the two ends forks into two separate forking waveguide 208 and 210 or is coupled to a Y-shape waveguide element. Each of the two separate forking waveguide 208 and 210 extends and further forks into two separate forking waveguides (e.g., 212). Alternatively, each of the two separate forking waveguide 208 and 210 is coupled to a Y-shape waveguide element. It is understandable to those skilled in the art that the Y-shape waveguide element is a result of a waveguide being bifurcated and need not be a separated element and the two legs of the Y-shape waveguide element can be extended to a desired length or coupled to a straight waveguide of a certain length so that a signal from each of the two legs of the Y-shape waveguide element can be split at a next forking stage. In any case, altogether there are four separate forking waveguides 212. Each of the four separate forking waveguides 212 is coupled to one of the N output ports, thus forming a 1:4 optical splitter with both the input and outputs being on one side of the optical device 200.

Figure 3B:
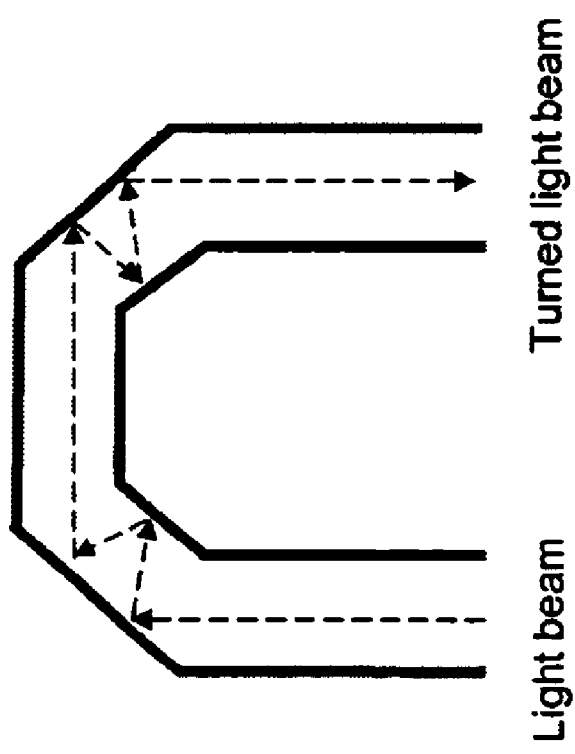
FIG. 3A and FIG. 3B show, respectively, two exemplary bending corners used as a curve to fold a waveguide so as to turn a light beam around.
Figure 3A:
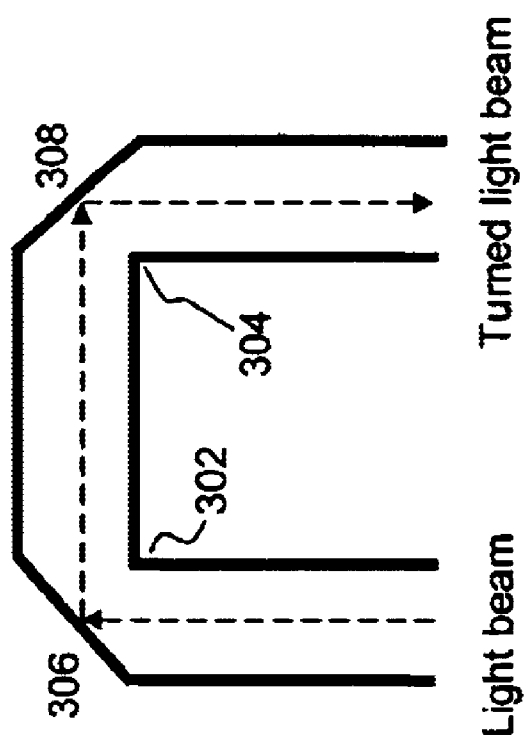

According to one embodiment, the predefined curve includes two 90 degree corners 302 and 304 as shown in FIG. 3A. As a result of the two 90 degree corners 302 and 304, there are two inside walls in the waveguide, respectively positioned at 45 degree and 135 degree. A light beam hits an inside wall of the waveguide positioned at 45 degree and turns 90 degree by being reflected by the inside wall. The reflected light beam then hits a second inside wall of the waveguide positioned at 135 degree, just opposite to the 45 degree wall, and turns another 90 degree by being reflected by the second inside wall. Thus the light beam completes a 180 degree turn.

According to another embodiment, the predefined curve includes one 45 degree corner 310 and one 135 degree corner 312 as shown in FIG. 3B. Specifically, two small segments of the waveguide form two respective reflecting tunnels 314 and 316. When a light beam hits a first inside wall of the reflecting tunnel 314, the light beam is reflected to a second inside wall of the reflecting tunnel 314 that again reflects the reflected back to the first inside wall. Because of the specific angle (e.g., 45 degree) of the reflecting tunnel 314 with respect to the waveguide, the first inside wall further reflects the reflected light beam towards the reflecting tunnel 316 that continue to reflect the light beam in the similar manner as the reflecting tunnel 314. As a result, the light beam completes a 180 degree turn.

It is possible to design the predefined curve in many ways to turn a light beam by 180 degree. However, consideration of the transmission as well as reflection loss due to the reflections in the curves shall be considered. Experiments have shown that, depending on applications, such loss can be controlled to a minimum with a proper curve.

Now referring back to FIG. 2, in operation, a signal coming to the input port 202 is guided to go through the main waveguide 206. When coming to the forking waveguides 208 and 210, the signal is split into two equal parts, one going through the waveguide 208 and the other going through the waveguide 210. As shown in the figure, the two equally split signals are further split in the waveguides 212, resulting in four equally divided signals that can be coupled out through the output ports 204.

Likewise, the optical device 200 can also be used as a combiner. In other words, four signals are coupled in, respectively, from the four ports 204 (therefore, they may not be referred to as the output ports). The four signals are merged into two signals in the waveguides 208 and 210. The two signals are further merged into a single signal in the waveguide 206. The combined signal is coupled out from the port 202 (which may not be referred to as the input port).

Figure 4:
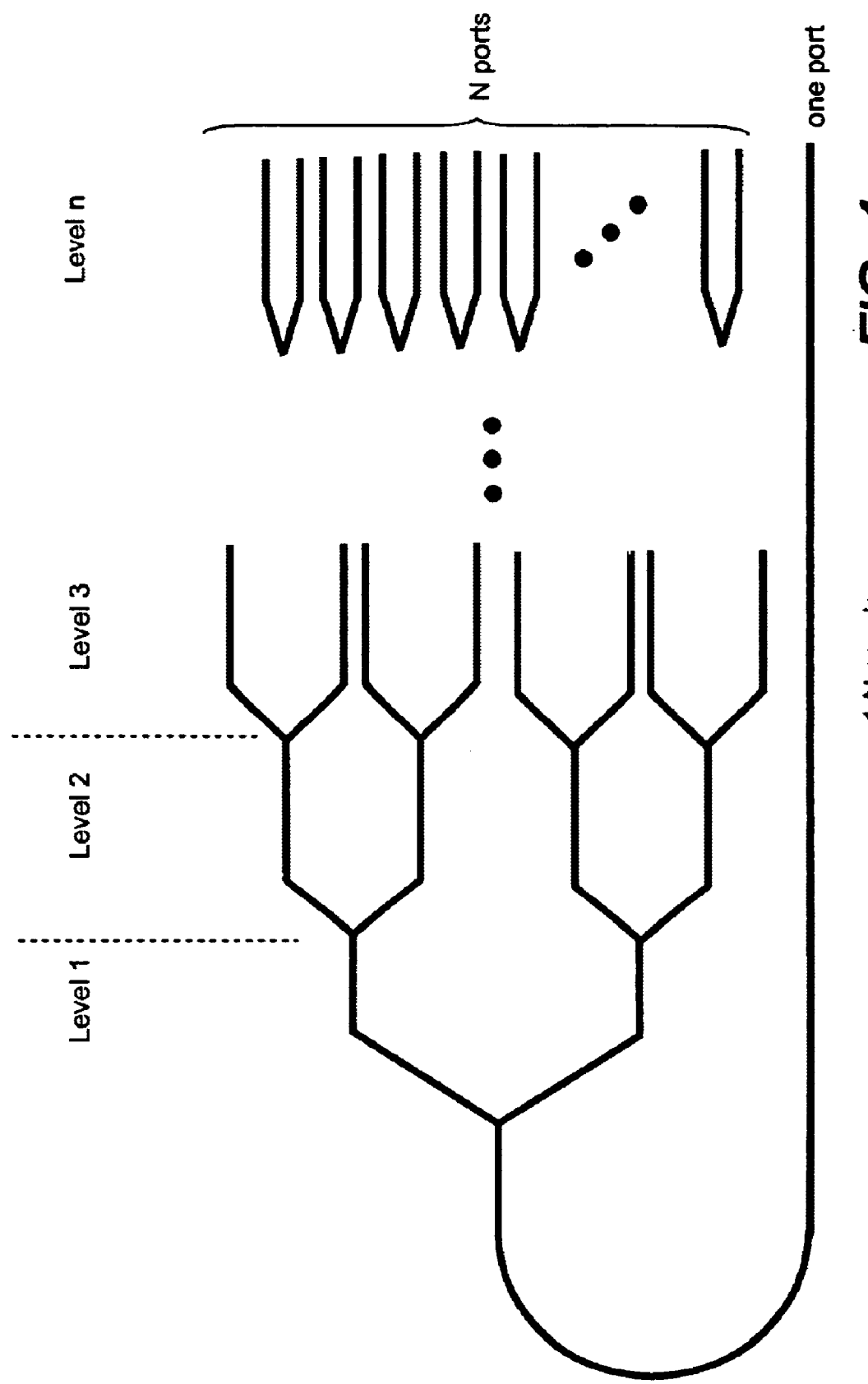
FIG. 4 shows an embodiment of a 1:N optical device contemplated in the present invention.

FIG. 4 shows an embodiment 400 of the optical device contemplated in the present invention. It shows that 1:N coupler can be realized with all N+1 ports on one side by bending the main waveguide 402 only. The ratio expression 1:N means that there is one first port and N second ports, where N=$2^n$ and n is a finite integer, such as 1, 2, or 3. Either the first port or the second ports can be used as receiving signals or outputting signals depending on the use of the coupler 400. Accordingly, the main waveguide 402 forks into two waveguides at level 1, the two waveguides respectively forks into four waveguides at level 2. If the four waveguides continue to fork in this manner, at level n, there will be N waveguides, each of which is coupled to one of the N second ports.

Figure 5:
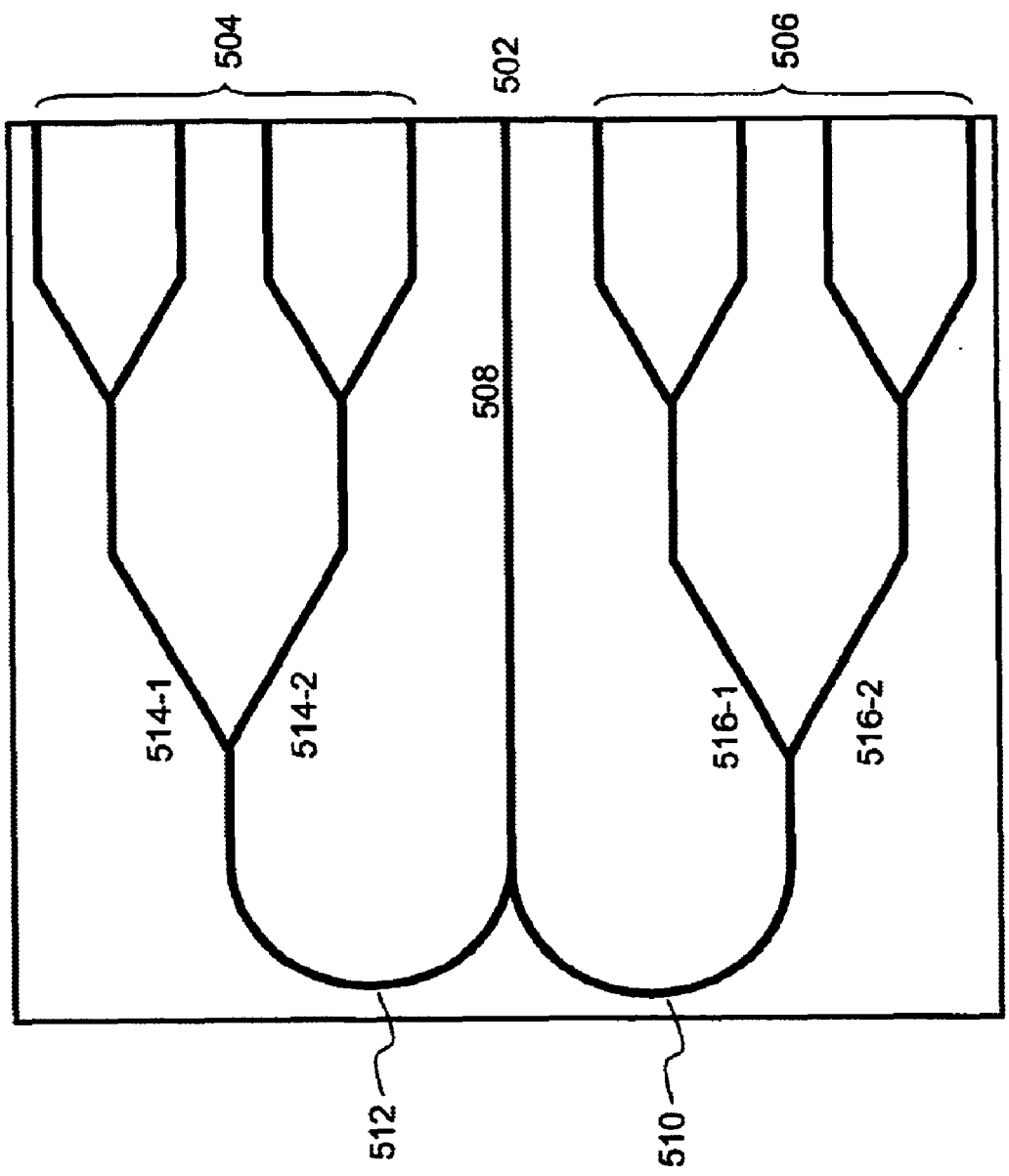
FIG. 5 shows another embodiment 500 according to one embodiment of the present invention.

FIG. 5 shows another embodiment 500 of the present invention. The 1:8 coupler 500 includes one first port 502 and eight second output ports 504 and 506. One of the features in the present invention is to balance the eight second ports around the first port, namely four ports 504 or 506 on each side of the first port 502. According to the embodiment 500, a main waveguide 508 forks into or is coupled to two forking waveguide 510 and 512. The two forking waveguides 510 and 512 are respectively bent around in two opposite directions so that each of the two forking waveguides 510 and 512 can be forked into or coupled to a pair of waveguides 514 or 516 that can be continued to be forked into or coupled to other waveguides till a total of eight ports are reached.

Figure 6:
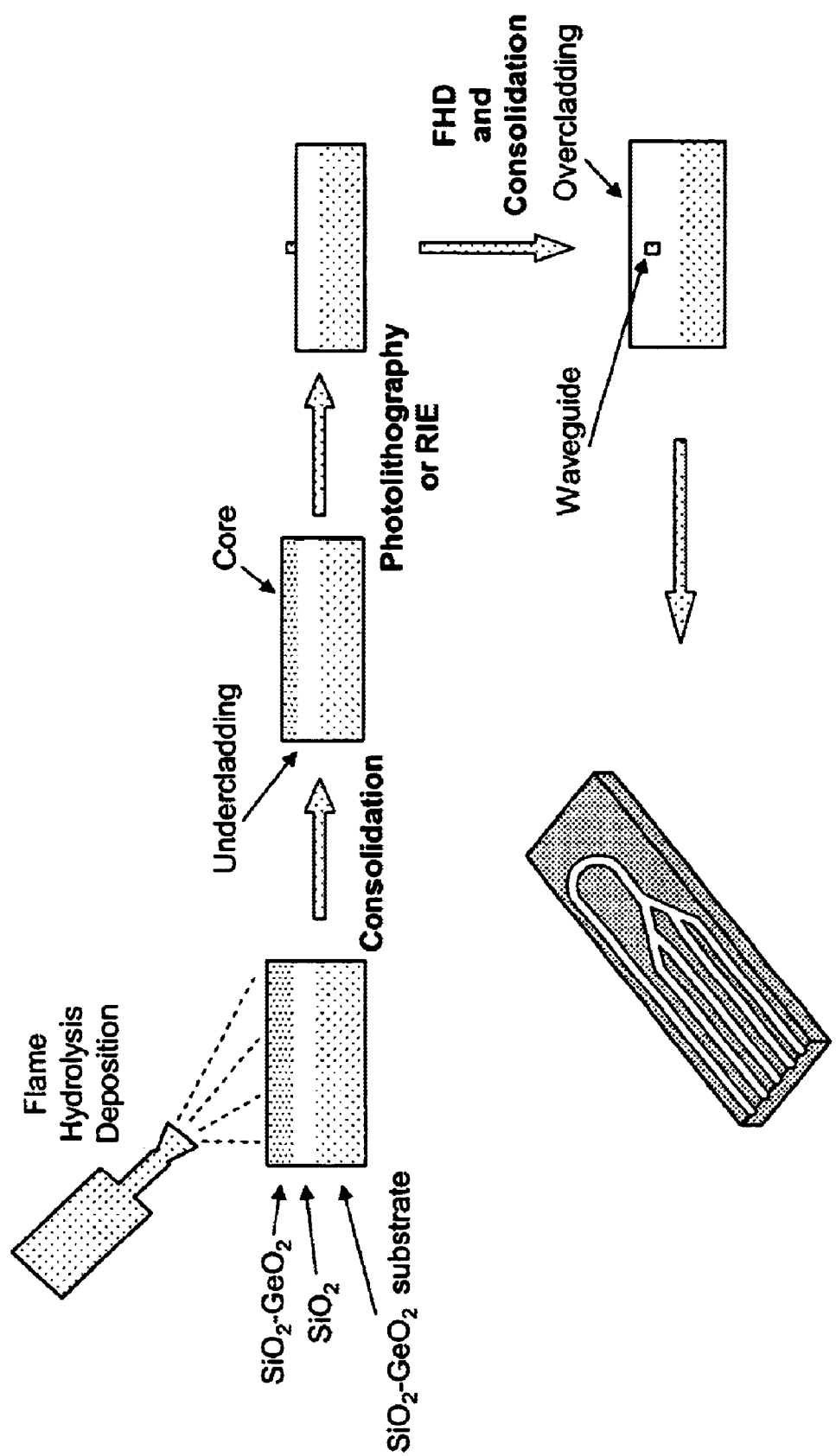
FIG. 6 illustrates a process to form waveguides in a substrate.

FIG. 6 shows an exemplary process 600 to form waveguides that can be used in the present invention. Essentially, a substrate (e.g. a silicon substrate) can be etched to form various waveguides suitable for transmitting optical signals at certain wavelengths. Those skilled in the art can appreciate that the process 600 can be readily controlled to form the bending waveguide around a curb in accordance with a predetermined curve.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the structure to hold the center-stripped fibers may be formed from a material other than silicon. Also the troughs that hold the fibers may be of other shapes. Accordingly, the scope of the present invention is defined by the appended claims rather than the forgoing description of embodiments.

We claim:

1. An optical device comprising:
a substrate processed to form a main waveguide, and two forking waveguides, wherein the main waveguide goes around a curb so that the main waveguide is towards and coupled to the two forking waveguides, the curb possesses collectively near 180 degrees so that both of the main waveguide and the two forking waveguides end on one side of the substrate;
wherein, when the optical device is used as a splitter, a signal coming through the main waveguide is split into two divided signals, each going through one of the two forking waveguides; and
wherein, when the optical device is used as a combiner, two signals respectively coming through the two forking waveguides are merged into a signal going through the main waveguide.

2. The optical device of claim 1, further comprising:
a first port coupling the main waveguide; and
a set of second ports respectively coupled to the two forking waveguides.

3. The optical device of claim 2, wherein the first and second ports are located on one side of the optical device.

4. The optical device of claim 3, wherein the curb includes two 90 degree right corners so that a light beam goes through the corners by reflecting internally in the main waveguide.

5. The optical device of claim 3, wherein the curb includes two 135 degree right corners so that a light beam goes through the corners by reflecting repeatedly internally in the main waveguide.

6. An optical device comprising:
a substrate processed to form a main waveguide, and two forking waveguides, the two forking waveguides going oppositely around a curb so that each of the two forking waveguides is towards and coupled to two straight waveguides, wherein the curb possesses collectively near 180 degrees;
wherein, when the optical device is used as a splitter, a signal coming through the main waveguide is split into two divided signals, each going through one of the two forking waveguides; and
wherein, when the optical device is used as a combiner, two signals respectively coming through the two forking waveguides are merged into a signal going through the main waveguide.

7. The optical device of claim 6, wherein each of the two forking waveguides is further coupled to two straight waveguides.

8. The optical device of claim 7, further comprising:
a first port coupling the main waveguide; and
a set of second ports, each of the second ports coupled to one of the two straight waveguides.

9. The optical device of claim 8, wherein the first and second ports are located on one side of the optical device.

10. The optical device of claim 6, wherein the curb includes two 90 degree right corners so that a light beam goes through the corners by reflecting internally in each of the two forking waveguides.

11. The optical device of claim 6, wherein the curb includes two 135 degree right corners so that a light beam goes through the corners by reflecting repeatedly internally in each of the two forking waveguides.

12. An optical device comprising:
a first port coupled to a main waveguide and located on one side of the optical device;
N second ports located on the same side of the optical device, wherein N is $2^n$, and n is a finite integer K; and
wherein the main waveguide is bent collectively near 180 degree and forks into or is coupled to two waveguides at level n=1, the two waveguides at level n=1, respectively, fork into or are coupled to four waveguides at level n=2, the four waveguides at level n=2 are, respectively, continuously, and repeatedly fork into or coupled to N waveguides at level n=k, so that each of the N waveguides coupled to one of the N second ports.

13. An optical device comprising:
a first port coupled to a main waveguide and located on one side of the optical device;
N second ports located on the same side of the optical device, wherein N is $2^n$, and n is a finite integer K; and
wherein the main waveguide is coupled to two forking waveguides, the two forking waveguides are respectively and oppositely bent collectively near 180 degree so that each of the two forking waveguides is towards and coupled to a pair of two waveguides.

14. The optical device of claim 13, wherein each of the two waveguides is further coupled to two waveguides at level n=2, the two waveguides at level n=2 are, respectively, continuously, and repeatedly coupled to N waveguides at level n=k, so that each of the N waveguides coupled to one of the N second ports.

15. A method for an optical device, the method comprising:
etching a substrate to form a plurality of waveguides suitable for transmitting optical signals in a certain range, wherein only one of the waveguides is formed around a curb; and
wherein the curb is so shaped that a light beam traveling in the only one of the waveguides turns collectively near 180 degree and is then split into two parts.

16. The method of claim 15, wherein the curb includes two 90 degree right corners so that the light beam goes through the corners by reflecting internally in the at least one of the waveguides.

17. The method of claim 16, wherein the curb includes two 135 degree right corners so that the light beam goes through the corners by reflecting repeatedly internally in the at least one of the waveguides.

* * * * *